J. P. SLATER.
HORSESHOE.
APPLICATION FILED MAR. 20, 1918.
1,390,171.
Patented Sept. 6, 1921.
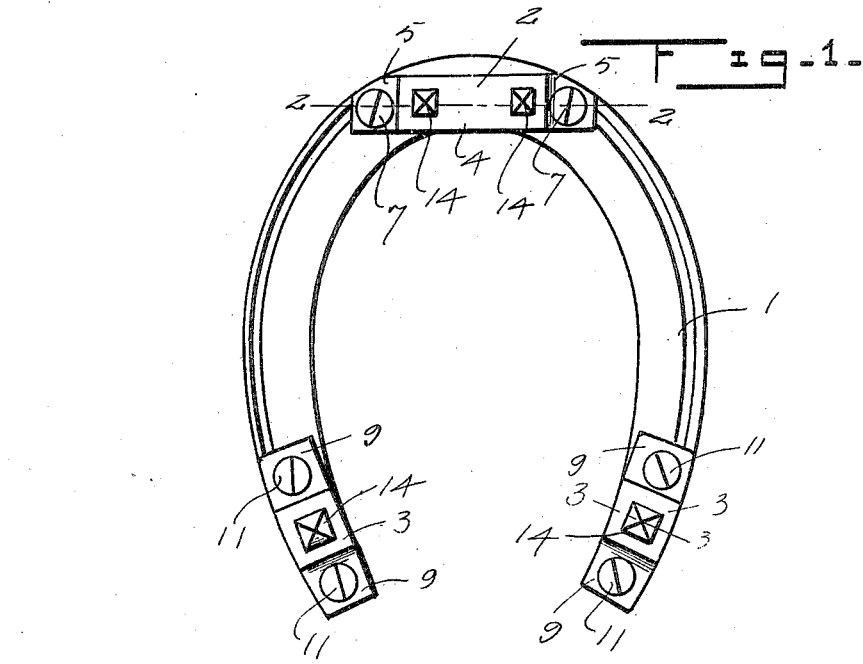
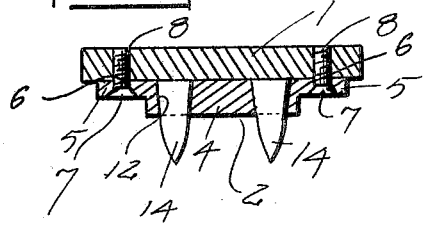
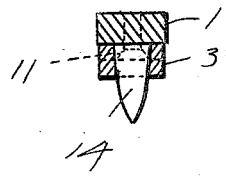
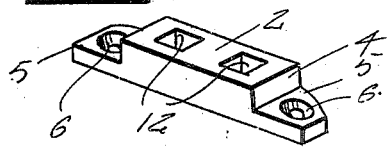
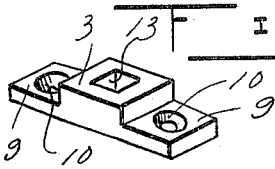
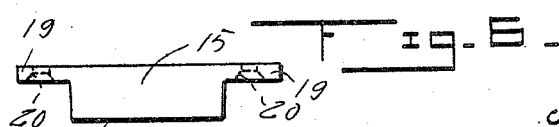
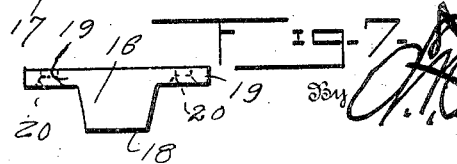
Inventor
J. P. Slater,
Witnesses

UNITED STATES PATENT OFFICE.

JASPER P. SLATER, OF CHARLESTON, WEST VIRGINIA, ASSIGNOR OF ONE-HALF TO J. M. CHASE, OF CHARLESTON, WEST VIRGINIA.

HORSESHOE.

1,390,171.

Specification of Letters Patent.  Patented Sept. 6, 1921.

Application filed March 20, 1918. Serial No. 223,654.

*To all whom it may concern:*

Be it known that I, JASPER P. SLATER, a citizen of the United States, residing at Charleston, in the county of Kanawha and State of West Virginia, have invented certain new and useful Improvements in Horseshoes; and I do hereby declare the following to be a full, clear, and exact description of the invention, such as will enable others skilled in the art to which it appertains to make and use the same.

This invention relates to horseshoes, and the primary object of the invention is to provide an improved horseshoe having detachable toe and heel calks which can be taken off of or placed on the shoe without removing the shoe from the horse's hoof, thereby allowing the convenient and expeditious interchanging of ice calks and plain calks.

Another object of the invention is the provision of an improved horseshoe having an improved ice calk having detachable and removable points so that the points can be readily removed and replaced when the same become worn.

A further object of the invention is the provision of an improved ice calk having detachable points and improved means for holding the points in position on the calks, when the calks are placed in position upon the shoe to prevent the displacement of the points.

A further object of the invention is the provision of a removable calk for horseshoes having flat attaching portions formed on each end thereof, the flattened portions being adapted to receive removable screws which are arranged to extend in the horse's shoe to hold the calk in position.

A still further object of the invention is to provide an improved device of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed, and illustrated in the accompanying drawing, forming a part thereof, in which:—

Figure 1 is a bottom plan view of the horseshoe provided with the improved ice calks, Fig. 2 is a detail section taken through the toe portion of the shoe on the line 2—2 of Fig. 1, Fig. 3 is a detail section taken on the line 3—3 of Fig 1, Fig. 4 is a detail perspective view of the improved toe ice calk showing the points removed therefrom, Fig. 5 is a perspective view of one of the heel ice calks showing the point removed therefrom, Fig. 6 is an elevation of the plain toe calk, and Fig. 7 is an elevation of one of the plain heel calks.

Referring to the drawing in detail, wherein similar reference numerals designate corresponding parts throughout the several views, the numeral 1 generally indicates the horseshoe which can be of the ordinary or any preferred construction having the improved toe calks 2 and heel calks 3 attached thereto.

The improved toe calks 2 are shown especially adapted for winter weather, when it is necessary for the animals to walk on ice, and the toe calks consist of an elongated bar 4 having its ends flattened to form attaching ears 5 which are provided with transversely extending countersunk openings 6 which are adapted to receive detachable fastening elements 7. The fastening elements 7 are threaded and are adapted to extend through threaded openings 8 formed in the toe portion of the shoe, which register with the openings 6 in the calks. By this construction, it can be seen that by simply removing the screws 7 the toe calk 2 can be readily removed. The heel calks are formed in identically the same manner as the toe calks 2, with the exception that the same are not formed relatively as long as the toe calks, and the same are provided with the flat attaching ears 9 having transverse openings 10 for receiving the screws 11 for extending into the horseshoe for detachably holding the same in position. The toe calk 2 is provided with a pair of spaced openings 12 which gradually taper downwardly from the upper edge thereof to the lower edge thereof, and the heel calks 3 are provided with a single tapering opening 13, and these openings are adapted to receive removable points 14 which are adapted to be used when there is ice on the ground. The points 14 are substantially pyramidal in shape and the same are placed in the openings 12 and 13 in the toe calks 2 and heel calks 3 and are securely wedged into position and when the calks are secured to the horseshoe removal of the points 14 is impossible as the narrow portion of the openings 12 and 13 prevent the removal thereof. It can be readily seen that when the points 14 become worn, the screws 7 and 11 can be removed from the calks and the points driven upwardly and outward of the openings 12 and 13 and new points readily inserted.

As shown in Figs. 6 and 7, plain calks are provided for ordinary use, and these calks 15 and 16 are readily interchangeable with the ice calks. The toe calk 15 and the heel calk 16 are provided identical in shape with the calks 2 and 3 with the exception that the calks 15 and 16 are formed with plain bearing portions 17 and 18 for engaging the ground. These portions can be tapered, if so desired. Formed on each side of the plain portions 17 and 18 are relatively thin flat attaching ears 19 which are provided with transverse openings 20 receiving detachable fastening elements for holding the same in position. The calks 2, 3, 15 and 16 are each provided with a plain upper surface for engaging the horseshoe so that the same can be readily secured thereto.

In practice, I have found that the form of my invention, illustrated in the accompanying drawing and referred to in the above description as the preferred embodiment, is the most efficient and practical; yet realizing that the conditions concurrent with the adoption of my device will necessarily vary, I desire to emphasize the fact that various minor changes in details of construction, proportion, and arrangement of parts may be resorted to, when required, without sacrificing any of the advantages of my invention as set forth.

What I claim as new is:—

A horseshoe calk having ears for the passage of fastening means therethrough, a body joining said ears, said body having an opening therethrough and a relatively thin wall surrounding the opening, a calk for removable disposition in and projection beyond said opening, said body at said wall in the absence of said calk adapted to service directly as a calk or tread with its traction increased by the provision of said opening, and said ears being flattened above the tread surface of the body to prevent undue contact with the road and consequent wear of the fastening means passing through the ears.

In testimony whereof I affix my signature in presence of two witnesses.

JASPER P. SLATER.
his × mark

Witnesses:
H. GLIEB,
RAY SLATER.